United States Patent [19]

Wenstrand

[11] Patent Number: 5,218,926
[45] Date of Patent: Jun. 15, 1993

[54] POULTRY WATERER
[76] Inventor: Thomas W. Wenstrand, R.R. 4, Mount Pleasant, Iowa 52641
[21] Appl. No.: 949,106
[22] Filed: Sep. 22, 1992

Related U.S. Application Data

[63] Continuation of Ser. No. 775,843, Oct. 15, 1991, abandoned.
[51] Int. Cl.⁵ .............................................. A01K 7/00
[52] U.S. Cl. ................................................... 119/77
[58] Field of Search ................ 119/74, 75, 77, 51.5; 43/130, 132.1; 222/630, 478, 479

[56] References Cited

U.S. PATENT DOCUMENTS

| | | | |
|---|---|---|---|
| 1,186,369 | 6/1916 | Barlow . | |
| 1,566,571 | 12/1925 | Appleton | 119/77 |
| 1,838,324 | 12/1931 | Olson | 119/77 |
| 1,840,615 | 1/1932 | Arduser et al. | 119/77 |
| 1,922,612 | 8/1933 | Barker | 119/77 |
| 4,034,715 | 7/1977 | Arner . | |
| 4,651,679 | 3/1987 | Fassauer . | |

Primary Examiner—Gene Mancene
Assistant Examiner—Thomas Price
Attorney, Agent, or Firm—Henderson & Sturm

[57] ABSTRACT

A poultry waterer for use as a liquid feeder comprising a conventional bucket as a container, combined with a pan feeder having an opening formed therein, wherein a vacuum is formed within the container during assembly and overturning of same to aid in tightly holding the bucket and feeder together, liquid escaping into the waterer through the opening after the assembly is overturned.

4 Claims, 1 Drawing Sheet

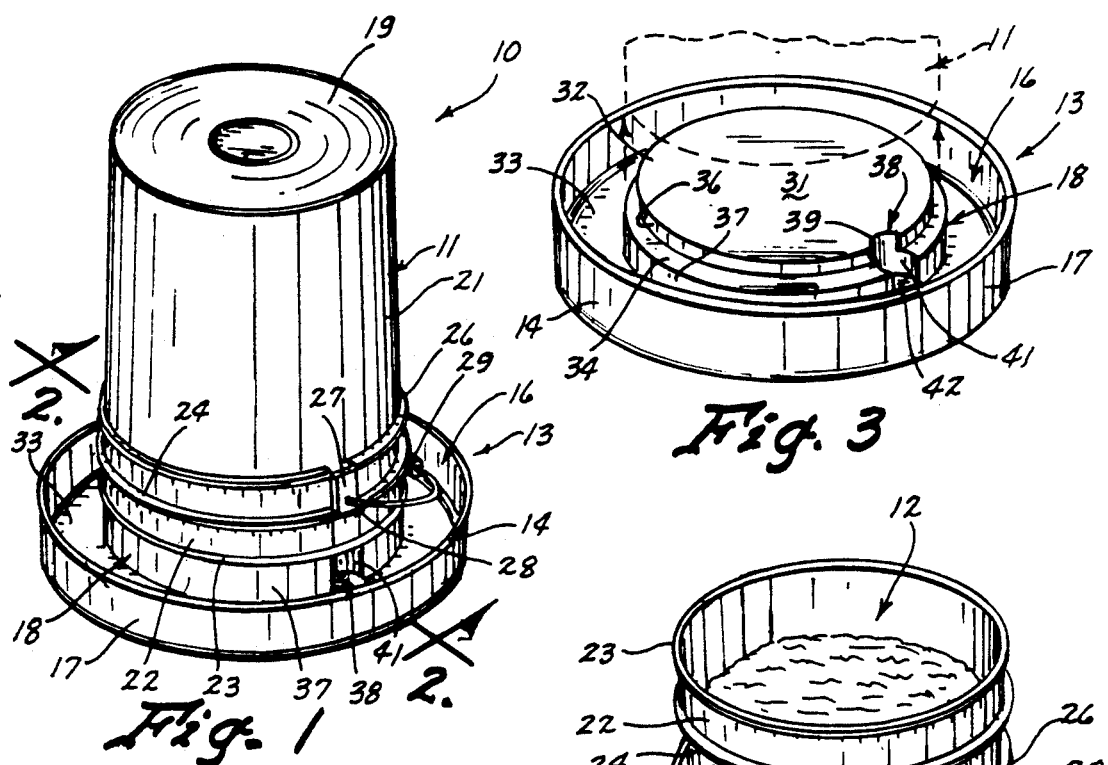
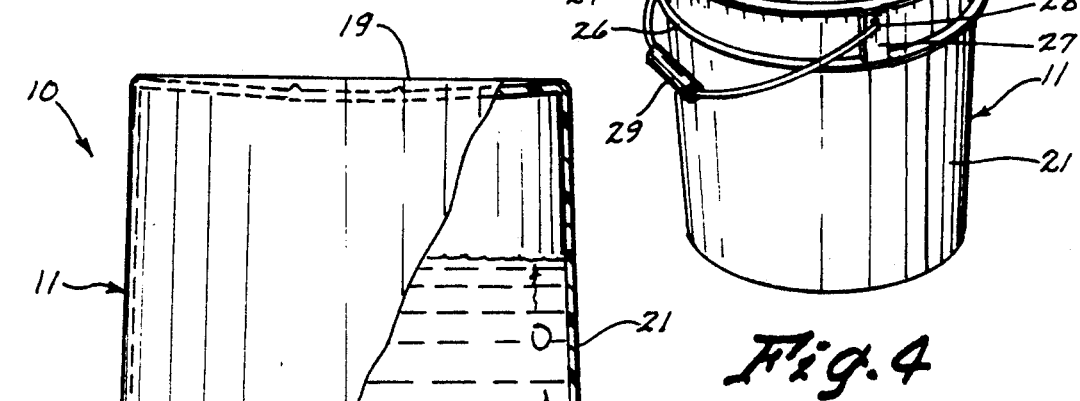
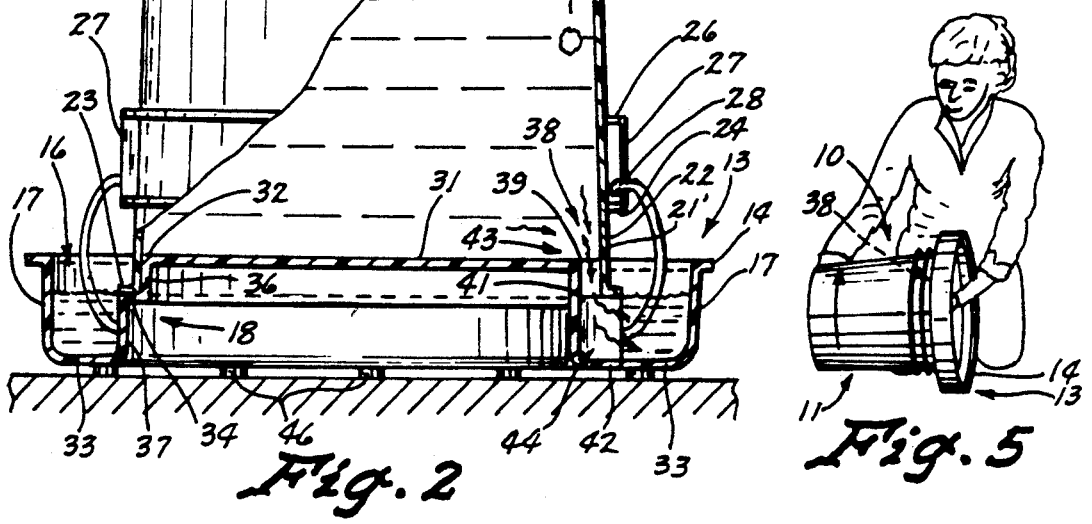

POULTRY WATERER

This is a continuation of co-pending application Ser. No. 07/775,843 filed on Oct. 15, 1991, now abandoned.

TECHNICAL FIELD

This invention relates to poultry waterers of a liquid nature which use an upending process of assembly for use.

BACKGROUND ART

The use of an upending process of assembly to effect the feeding of liquid for poultry and like animals is known, however the structure is unnecessarily complicated, and does not use commercially available containers for example.

DISCLOSURE OF THE INVENTION

The present invention is an improved poultry waterer comprising two elements only, one a commercially available bucket-type container for holding a fluid and having an open end and a closed end, and the other element a pan waterer adapted to frictionally engage the container open end whereby to form a vacuum during upending of the assembly, and with an opening formed in the waterer for permitting a controlled escape of fluid into the waterer when the assembly is upended.

It is an object of this invention to provide a new and novel poultry waterer.

Another object of this invention is to provide an improved poultry waterer comprised only of two elements, one of which is a commercially available container requiring no modifications.

Still another object of this invention is to provide an assembly of two elements only for a poultry waterer, one of the elements being a commercially available container having other uses as well.

Yet another object of this invention is the utilization of plastic elements fulfilling the aforementioned objectives for increased life, durability and cleanliness of the product formed thereby.

BRIEF DESCRIPTION OF THE DRAWINGS

Further objects and additional advantages of the invention will become apparent from the following description and annexed drawings wherein:

FIG. 1 is a perspective view of the waterer;

FIG. 2 is an enlarged, partial sectional view as taken along the line 2—2 in FIG. 1;

FIG. 3 is a perspective view of the waterer pan alone;

FIG. 4 is a perspective view of the container shown partially filled with a liquid and in a conventional position; and FIG. 5 is a pictorial view showing the container and feeding pan being assembled and upended for use in the positions of FIGS. 1 and 2.

BEST MODE FOR CARRYING OUT THE INVENTION

Referring to the drawings, the poultry waterer of this invention is indicated generally at (10) in FIG. 1 and comprises a first unit (11) which is a commercially available bucket or container having an open end (12); and a second unit (13) for assembly with the container (11), and which second unit (13) comprises a pan (14) having a trough (16) (FIGS. 2 and 3) formed by an outer wall (17) and an inner wall (18).

More particularly, the container (11) has a closed end (19), and although the container (11) may be of any convenient shape such as round, oval, square, rectangular, etc, in the preferred form it is round with a circular wall (21) terminating in a margin (22) which forms the open end, and with an outurned, lip (23) formed about the peripheral edge of the margin (22). A pair of ring elements (24), (26) extend about the circumference of the wall (21), having a par of opposed enclosures (27) formed therewith for holding, respectively the ends (28) of a handle (29) for the container (11).

Although the container (11) capacity may vary, the preferred capacities are either 3.5 or 5.0 gallons. The container (11) is constructed of a high density polyethylene (HDPE) of a wall thickness range of 0.75 plus or minus 0.25 mil. such that the wall (21) is of a non-collapsing nature to ensure operability and durability of the container (11). More specifically, the wall thickness of the 3.5 gallon container (11) is 0.70 mil. (0.070) and of the 5.0 gallon container (11) is 0.90 mil. (0.090). Similarly, the pan (14) is also of a thin molded plastic material of a comparable thickness.

The second unit pan (14) has a raised, substantially flat center portion (31) (FIG. 2) of a circular formation, the periphery of which is the upper edge (32) of the inner wall (18), the base of the inner wall (18) leading to the bottom (33) of the circular trough (16) completed by the outer wall (17).

Intermediate the upper edge (32) of the inner wall (18) and its base at the trough bottom (33), a shoulder (34) is formed having a normally horizontally disposed ledge, and thus forming an upper portion (36) (FIG. 2) of the inner wall (18) and a lower portion (37). The outer diameter of the inner wall upper portion (36) is substantially identical to the inner diameter of the container margin (22) such that the margin (22) may fit over the upper portion (36) in a snug, frictional, releasable engagement, with the outurned lip (23) of the container (11) resting on the shoulder (34) (FIG. 2).

The pan (14) is completed with a semi-circular depression (38) (FIGS. 2 and 3) formed laterally within the inner wall (18) at any circumferential location therein, it being noted that the upper edge (39) of the depression cuts out-in effect, a small portion of the center portion (31) as best seen in FIG. 3, and wherein the rear semi-circular wall (41) of the depression (38) extends normal to both the center portion (31) and the trough bottom (33), the semi-circular base (42) of the depression (38) merging with the trough bottom.

The purpose of the depression (38) is to let liquid held within the container (11) flow out of the container (11) downwardly through a passage (43) (FIG. 2) formed between the rear wall (41) of the depression (38) and the opposed portion (21') of the container wall (21), and thence outwardly into the trough (16) through a passage (44) opening up below the container lip (23), again with the depression rear wall (41) and its base (42) forming the rear of the lower passage (43).

To place the poultry waterer (10) in condition for use, the container (11) is filled with a liquid such as water from any source as illustrated in FIG. 4. The pan (14) is then fitted onto and over the container (11) in an inverted position from that shown in FIG. 3. Then with the depression (38) forming an opening held in an up position as indicated in FIG. 5, the assembly is inverted or upended, an immediate vacuum forming with the container (11) which helps keep the pan (14) tightly held to the container (11), and with the assembly (10) then placed on the ground or other surface (44) in the position as shown in FIGS. 1 and 2. A series of feet (46) (FIG. 2) may be formed in a circular, arcuately spaced manner on the bottom (33) of the trough (16).

When placed in the position of FIG. 2, as explained before, the liquid flows from the container (11) into the trough (16) to a level therein determined by the height of the vertical opening between the merged depression base (42) and trough bottom (33), and the container lip (23). To keep the liquid from overflowing, the vertical opening must remain less than the height of the pan outer wall (17).

The foregoing disclosure is representative of a preferred form of the invention. It is to be interpreted in an illustrative, rather than a limiting sense.

I claim:

1. A poultry waterer for feeding liquids comprising;
an assembly of only two elements having;
a circular container for containing a liquid, said container having a closed end and an open end, and being comprised of a molded plastic having a circular, non-collapsible side wall; and
a circular pan comprised of a molded plastic, said pan having a raised circular center portion forming an outer trough including an exterior wall and an interior wall, both walls integral with said pan, said interior wall having a circular base portion and a circular upper portion of a diameter less than the diameter of said base portion forming thereby a normally horizontally disposed ledge, and with said interior wall having a transverse depression formed therein; and
said circular container and said circular pan capable of being assembled into a unit by said container open end embracing said pan interior wall upper portion except for said depression, said embracement being in snug, frictional, releasable manner.

2. The poultry waterer of claim 1, and further wherein the container holds between 3.5 to 5.0 gallons of liquid.

3. The poultry waterer of claim 1, and further wherein the side wall of said container has a thickness of $0.075 \pm 0.025$ mil.

4. The poultry waterer of claim 1, and further wherein said container and said pan are each constructed of a high density polyethylene material.

* * * * *